United States Patent
Kumar et al.

(10) Patent No.: US 10,159,057 B1
(45) Date of Patent: Dec. 18, 2018

(54) DEVICE, SYSTEM, AND METHOD FOR PERSISTING NETWORK REGISTRATION REJECTION CAUSES

(71) Applicant: APPLE INC., Cupertino, CA (US)

(72) Inventors: Utkarsh Kumar, Fremont, CA (US); Lakshmi N. Kavuri, Cupertino, CA (US); Samuel J. Miller, San Jose, CA (US); Harshit Chuttani, Fremont, CA (US); Rohan Malthankar, San Jose, CA (US); Francisco Gonzalez, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/612,832

(22) Filed: Jun. 2, 2017

(51) Int. Cl.
*H04W 60/04* (2009.01)
*H04W 88/02* (2009.01)
*H04W 8/18* (2009.01)

(52) U.S. Cl.
CPC ............ *H04W 60/04* (2013.01); *H04W 8/183* (2013.01); *H04W 88/02* (2013.01)

(58) Field of Classification Search
CPC ............. H04W 36/0083; H04W 36/38; H04W 36/0061; H04W 36/30; H04W 48/02; H04W 48/08; H04W 12/08; H04W 48/14; H04W 60/06; H04W 76/02
See application file for complete search history.

(56) References Cited

U.S. PATENT DOCUMENTS

| | | | | |
|---|---|---|---|---|
| 5,884,172 A * | 3/1999 | Sawyer | .................. | H04W 60/00 455/435.1 |
| 7,136,997 B2 * | 11/2006 | Yamaguchi | ........... | H04W 12/06 713/155 |
| 8,326,268 B2 * | 12/2012 | Ahn | ....................... | H04W 12/12 455/410 |
| 8,971,884 B2 * | 3/2015 | Ahluwalia | ............ | H04W 60/06 370/242 |
| 2008/0081636 A1 * | 4/2008 | Nylander | .............. | H04W 48/04 455/452.2 |
| 2010/0190497 A1 * | 7/2010 | Pudney | ................. | H04W 12/08 455/435.1 |
| 2011/0117916 A1 * | 5/2011 | Dahlen | ................. | H04W 48/02 455/436 |
| 2017/0273118 A1 * | 9/2017 | Hasegawa | ............. | H04W 76/02 |

* cited by examiner

*Primary Examiner* — Jean Gelin
(74) *Attorney, Agent, or Firm* — Fay Kaplun & Marcin, LLP

(57) ABSTRACT

A device, system, and method persists network registration rejection causes. The method is performed at a device connected to a network and comprising a temporary memory and a persistent memory, the device using the data stored in the temporary memory when performing network registration operations. When a power cycle is detected, the method includes determining whether there is persistent data in the persistent memory for a first attempt to register with the network prior to the power cycle, the persistent data including a rejection cause for the first attempt. When there is the persistent data in the persistent memory, the method includes determining whether the persistent data is valid for a second attempt to register with the network after the power cycle. When the persistent data is valid, the method includes generating and storing cause data based on the persistent data in the temporary memory prior to the second attempt.

19 Claims, 4 Drawing Sheets

US 10,159,057 B1

DEVICE, SYSTEM, AND METHOD FOR PERSISTING NETWORK REGISTRATION REJECTION CAUSES

BACKGROUND INFORMATION

A user equipment (UE) may be configured to establish a connection to at least one of a plurality of different networks or types of networks as well as with other UEs to perform a variety of different functionalities via the connection. For example, the UE may connect to a first type of network (e.g., Long Term Evolution (LTE) network) to communicate with another UE through the network connection (e.g., a user of the UE may perform a voice call or transmit a text to another user of another UE). In another example, the UE may connect to a second type of network (e.g., WiFi network) to receive browser data at a higher rate of data exchange. In a further example, the UE may directly connect to a further UE using a short-range communication protocol (e.g., BlueTooth).

When the UE performs connection operations to register with a network, the registration process may fail where the UE is rejected for a variety of different reasons. While a baseband processor and the corresponding functionality on a transceiver remain active, data corresponding to this rejection cause may be stored for use by these components in a temporary manner (e.g., in a random access memory (RAM)). Accordingly, when further attempts to register with the network are to be performed, the rejection cause in the data that is temporarily stored may be used to determine whether the attempt is to be made. For example, the data may indicate a rejection cause from the network that indicates any subsequent attempt would also result in the registration with the network to fail. In this manner, the UE may determine that the operations are not to be performed, which conserves power usage. However, there are a variety of reasons that the temporarily stored data including the rejection causes are not available or deleted, which prompts the UE to perform connection operations that result in registration failures and use additional power.

SUMMARY

The exemplary embodiments are directed to a method, comprising: at a device that is configured to establish a connection to a network, the device comprising a memory arrangement including a temporary memory and a persistent memory, the device using the data stored in the temporary memory when performing operations associated with registering with the network: when a power cycle is detected, determining whether there is persistent data in the persistent memory corresponding to a result from a first attempt to register with the network prior to the power cycle, the persistent data including a rejection cause received from the network for the first attempt; when there is the persistent data in the persistent memory, determining whether the persistent data is valid to use in a second attempt to register with the network after the power cycle; when the persistent data is valid, generating cause data based on the persistent data; and storing the cause data in the temporary memory prior to performing the second attempt.

The exemplary embodiments are directed to a device, comprising: a transceiver; a memory arrangement including a temporary memory and a persistent memory; a baseband processor configured in conjunction with the transceiver to establish a connection to a network, wherein the baseband processor uses data stored in the temporary memory when performing operations associated with registering with the network; and an applications processor configured to detect a power cycle of the baseband processor, when the power cycle is detected, the applications processor determining whether there is persistent data in the persistent memory corresponding to a result from a first attempt to register with the network prior to the power cycle, the persistent data including a rejection cause received from the network for the first attempt, wherein, when there is the persistent data in the persistent memory, the applications processor determines whether the persistent data is valid to use in a second attempt to register with the network after the power cycle, wherein, when the persistent data is valid, the applications processor generates cause data based on the persistent data, and wherein, the applications processor stores the cause data in the temporary memory prior to the baseband processor performing the second attempt.

The exemplary embodiments are directed to a method, comprising: at a device that is configured to establish a connection to a network, the device comprising a memory arrangement including a temporary memory and a persistent memory, the temporary memory deleting data stored therein after a power cycle, the persistent memory persisting data stored therein after the power cycle, the device using the data stored in the temporary memory when performing operations associated with registering with the network: transmitting a request to the network to register with the network; receiving a response to the request from the network; when the response includes a rejection cause indicating the request is rejected, storing the rejection cause in both the temporary memory and the persistent memory, wherein, after a power cycle, the rejection cause is capable of being used in a further request to the network to register with the network.

DETAILED DESCRIPTION

Figure 1:
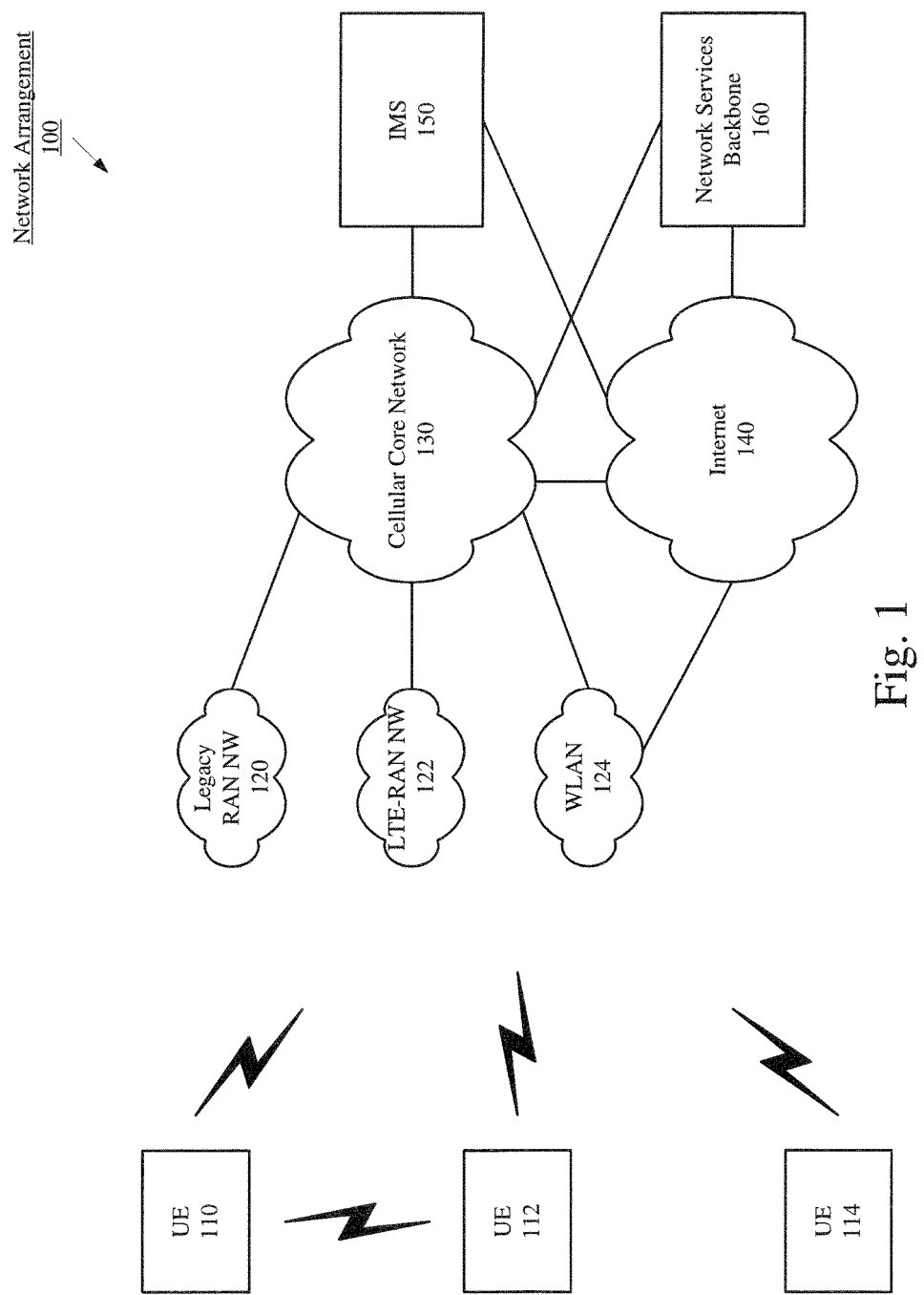
FIG. 1 shows a network arrangement according to the various exemplary embodiments described herein.

The exemplary embodiments may be further understood with reference to the following description and the related appended drawings, wherein like elements are provided with the same reference numerals. The exemplary embodiments are related to a device, system, and method for persisting a rejection cause from a network registration attempt. Specifically, a user equipment (UE) may attempt to connect to a network which includes a registration procedure and, for any of a variety of reasons, the registration may fail. Although the rejection cause for the failed registration attempt may be stored temporarily, when a subsequent registration attempt is made, the rejection cause may become unavailable. However, the circumstances in which the subsequent registration attempt is being made may be substantially similar to the prior registration attempt and not user initiated. In these circumstances, knowing the previous rejection cause may allow the UE to conserve power by not performing operations that lead to another registration failure. Accordingly, the exemplary embodiments provide a mechanism to persist the rejection cause and subsequently use the persistent rejection cause for further registration attempts, when applicable.

Initially, it is noted that the exemplary embodiments are described with regard to a UE. However, the UE is only exemplary. The exemplary embodiments may be utilized with any device that may establish a connection with one or more networks and configured with the hardware, software, and/or firmware to exchange and process data with any of these one or more networks. Therefore, the UE as described herein is used to represent any device.

It is also noted that the exemplary embodiments are described with regard to the UE having a companion UE. When the UE and the companion UE are connected to one another over a short-range communication pathway, the UE may receive data via the companion UE. When the UE and the companion are not connected, the UE may receive data over a connected network directly (instead of through the companion UE). However, the use of the UE and the companion UE is only exemplary. The exemplary embodiments may be utilized for any UE (with or without a companion UE) and represent any device.

It is further noted that the exemplary embodiments are described with regard to a failure of a registration procedure in which a rejection cause is provided by the network. However, the use of the registration procedure, the failure of the registration procedure, and the rejection cause are only exemplary. The exemplary embodiments may be modified and/or utilized with any procedure in which a result of the procedure is persisted for use in determining how a subsequent procedure is to be performed.

With developments to UEs as well as further types of UEs being introduced (e.g., with the Internet of Things (IoT)), the manner in which the UEs may communicate with networks or other UEs has expanded. For example, a first UE may be linked to a second UE as companions. Specifically, the first UE may be a wearable while the second UE may be a smartphone which is the wearable's companion. While the wearable and the smartphone are within range of one another within the limits of a short-range communication protocol, the wearable and the smartphone may communicate such that data being received by the smartphone may be relayed to the wearable (e.g., an incoming call or text received on the smartphone may be relayed to the wearable). In this manner, the wearable may conserve a limited power supply by using only the short-range communication protocol instead of having to associate with and monitor one or more networks. That is, components of the UE such as a baseband processor and associated functionality/operations performed on a transceiver for the network may be deactivated.

The UE (e.g., the wearable) may also be configured to associate and exchange data with one or more networks independently without the companion UE. For example, when the UE is separated from the companion UE (e.g., greater than the distance of the short-range communication protocol), the UE may include the hardware, software, and firmware required to connect to one or more networks such as a cellular network. However, as noted above, the UE may have a limited power supply (e.g., even more limited than the companion UE) and connecting with networks may drain more power than only using the short-range communication protocol. Specifically, performing initial connection operations including a registration procedure may utilize additional power. However, previous attempts in performing this registration procedure may provide insight to subsequent attempts in performing this registration procedure. Accordingly, the exemplary embodiments are configured to consider and take advantage of this historical information.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, other types of IoT devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120 (e.g., a first type of cellular network), a LTE RAN (LTE-RAN) 122 (e.g., a second type of cellular network), and a wireless local area network (WLAN) 124 (e.g., a WiFi network). However, it should be understood that the UEs 110-114 may also communicate with other types of networks and may also communicate using a wired connection. For example, other types of networks may include Wideband Code Division Multiplexing Access (WCDMA) RAN, Global System for Mobile communication (GSM) RAN, 3G/4G RAN, new generation (NG) RANs including 5G, etc. With regards to the exemplary embodiments, the UEs 110-114 may establish a connection with one or more of the legacy RAN 120, the LTE-RAN 122, and the WLAN 124. For example, the UEs 110-114 may have a legacy chipset, a LTE chipset, and/or a WiFi chipset that are used to communicate with the legacy RAN 120, the LTE-RAN 122, and/or the WLAN 124, respectively. The use of three (3) networks is only exemplary and there may be any other number of networks with which the UEs 110-114 may communicate.

Each of the UEs 110-114 may also be configured to communicate with the other UEs 110-114 without using the networks 120-124. For example, as illustrated, the UE 110 may communicate with the UE 112 using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In a specific exemplary embodiment, if the short-range communication protocol is being used, the UE 110 and the UE 112 may have a companion relationship. In the companion relationship, the UE 110 may utilize only the short-range communication protocol without connecting to any of the networks 120-124 while the UE 112 may connect to one or more of the networks 120-124 and relay data exchanged between the networks 120-124 and the UE 112 to the UE 110 over the short-range communication pathway. However, it is again noted that the use of a companion relationship is only exemplary and the UE 110 may connect to one or more of the networks 120-124 whether or not the UE 110 is within range of communicating with the UE 112 over the short-range communication pathway.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. The WLAN 124 may include any type of wireless local area network (WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. To use the features of the IMS 150, the UEs 110-114 may register with the IMS through a registration procedure via one of the networks 120, 122, 124. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The exemplary embodiments are directed to the UE 110 being capable of connecting to one of the networks 120, 122, 124 and also capable of connecting to the UE 112 over a short-range communication protocol. Specifically, the UE 110 may be in a companion relationship with the UE 112. For illustrative purposes, the exemplary embodiments are described with the UE 110 connecting to the LTE-RAN 122 but it is again noted that the use of the LTE-RAN 122 is only exemplary and the exemplary embodiments may be utilized with the UE 110 connecting to any type of network.

While not connected to the UE 112, the UE 110 may connect to the LTE-RAN 122 using its baseband processor and associated functionality/operations on its transceiver (collectively referred to herein as "baseband"). When the baseband of the UE 110 attempts to register with the LTE-RAN 122, the LTE-RAN 122 may determine if the UE 110 is a valid device that is capable and/or allowed to connect to the LTE-RAN 122. If a determination is made that the UE 110 is invalid, the LTE-RAN 122 may reject the registration based on a rejection cause which is provided to the UE 110.

In a first example, the rejection cause may be a non-fatal cause as defined by 3GPP 24.008 and 24.301. The non-fatal cause may be based on a given location area (LA) (e.g., a set of base stations grouped to optimize signaling operations for networks in general), a routing area (RA) (e.g., an equivalent of the LA for packet-switched domains), or tracking area (TA) (e.g., an equivalent of the LA and/or RA for the LTE-RAN 122). The non-fatal cause may also be specified in 3GPP 24.008 and 24.301. For example, the non-fatal cause may be specified as #12, which indicates that the location of the UE 110 is not allowed. Specifically, the #12 non-fatal cause may be sent from the LTE-RAN 122 to the UE 110 if the UE 110 requests an update in location in an area where the UE 110 is not allowed to operate based on a subscription. In another example, the non-fatal cause may be specified as #13, which indicates that a roaming functionality on the UE 110 is not allowed in its current location. Specifically, the #13 non-fatal cause may be sent from the LTE-RAN 122 to the UE 110 if the UE 110 requests an update in location in an area of the LTE-RAN 122 which offers roaming to the UE 110 if indicated in a subscription. In a further example, the non-fatal cause may be specified as #15, which indicates that there are no suitable cells or base stations in the area where the UE 110 is currently located. Specifically, the #15 non-fatal cause may be sent from the LTE-RAN 122 to the UE 110 if the UE 110 requests an update in location in an area where the UE 110 is not allowed to operate based on a subscription and when the UE 110 should find another allowed area in the LTE-RAN 122.

In a second example, the rejection cause may be a fatal cause. The fatal cause may be based on features of a subscriber identity module (SIM) or universal SIM (USIM) of the UE 110. For illustrative purposes, the SIM is used to represent any identification of the user and/or the UE 110 with a corresponding subscription including the USIM. The fatal cause may also be specified in 3GPP 24.008 and 24.301. For example, the fatal cause may be specified as #2, which indicates that the international mobile subscriber identity (IMSI) is not known in the home location register (HLR) of an area where the UE 110 is located. In another example, the fatal cause may be specified as #3, which indicates that the UE 110 is illegal.

Specifically, the SIM of the UE 110 may be determined to be illegal if an identity included in the SIM of the UE 110 is not acceptable or the UE 110 fails to pass an authentication check. In a further example, the fatal cause may be specified as #6, which indicates that the type of equipment of the UE 110 is not allowed by the LTE-RAN 122 in the area where the UE 110 is located. In yet another example, the fatal cause may be specified as #7, which indicates that a general packet radio service (GPRS) is not allowed where an IMSI attach request is provided from the UE 110 to the LTE-RAN 122, but the LTE-RAN 122 determines that the GPRS is not allowed for the UE 110. In an additional example, the fatal cause may be specified as #8, which indicates that the GPRS and non-GPRS are not allowed for the UE 110.

It is noted that the above example of rejection causes and the corresponding codes are only exemplary. There may be other rejection causes for the LTE-RAN 122 or other rejection causes related to other types of networks. However, all the types of rejection causes may be grouped into the above two general categories, non-fatal and fatal.

When the UE 110 receives a rejection cause from the LTE-RAN 122, the UE 110 is configured to perform several operations. When the UE 110 receives a rejection cause that is a non-fatal cause, the UE 110 may be configured to store the non-fatal cause into a temporary or volatile memory such as a random access memory (RAM) of the baseband. Specifically, the non-fatal cause may be stored in a corresponding forbidden list. The UE 110 may also be configured to initiate a timer (e.g., 12 hours) for the temporarily stored non-fatal cause, which upon expiry, results in the non-fatal cause to be deleted from the baseband memory. The non-fatal cause may also be removed or deleted based on other factors such as when the device or baseband is power cycled or when a SIM card is physically removed from the UE 110. However, while the non-fatal cause is still temporarily stored and the timer has not expired, the UE 110 may utilize the non-fatal cause to avoid attempts of the registration procedure on the forbidden LA, RA, or TA as indicated in the non-fatal cause.

When the UE 110 receives a rejection cause that is a fatal cause, the UE 110 may be configured to mark the SIM as illegal for packet switched (PS) and non-PS services based on the fatal cause. In a substantially similar manner as the non-fatal cause, the UE 110 may store this marking of the SIM as illegal into the temporary or volatile memory of the baseband. Thus, while the SIM card physically remains in the UE 110 or the UE/baseband is not rebooted or power cycled, the UE 110 may utilize the fatal cause to avoid attempts of the registration procedure. However, if the SIM card is physically removed or the UE/baseband is rebooted/power cycled, the fatal cause may be deleted and unavailable.

As noted above, the rejection cause (both non-fatal causes and fatal causes) may be stored in a temporary memory of the baseband. However, the rejection cause that is stored in the temporary memory may be deleted when the UE 110 or the baseband of the UE 110 is power cycled. When the UE 110 is in a companion relationship, the UE 110 may experience power cycling of the baseband more frequently than if the UE 110 were not in the companion relationship. Specifically, the UE 110 in the companion relationship may be configured to prioritize utilizing the short-range communication protocol rather than a network connection to the LTE-RAN 122. For example, using the short-range communication protocol may use less power than the network connection for the UE 110 to conserve power. Accordingly, when the short-range communication protocol is determined to be available, the UE 110 may be configured to switch to the direct connection to the UE 112. However, by switching from the network connection to the short-range communication protocol, the baseband is deactivated. When the baseband becomes re-activated, the baseband is power cycled. In this manner, whenever the baseband becomes deactivated/re-activated (e.g., power cycled), particularly when the short-range communication protocol is used for the companion relationship, the rejection cause stored in the temporary memory of the baseband may be lost. When previously stored rejection causes are deleted, the UE 110 proceeds with performing connection operations such as those used with a registration procedure as if the rejection cause were never determined, even if the circumstances surrounding the previous rejection have not significantly changed.

Given the above aspects of the registration procedure, a result in which a rejection cause is provided from the LTE-RAN 122 and stored in a temporary memory, and the baseband of the UE 110 being power cycled, there may be scenarios where the UE 110 may benefit from persisting the rejection cause even after the baseband has power cycled for use in subsequent registration procedure attempts. In an exemplary scenario, the baseband may be in a state where the baseband has a list of forbidden LA/RA/TA due to a non-fatal cause received from the LTE-RAN 122 or in a state where the LTE-RAN 122 has invalidated the SIM by sending a fatal cause. Accordingly, the baseband of the UE 110 may be activated and used in attempting a registration procedure to the LTE-RAN 122. As noted above, the UE 110 may be configured to store the rejection cause in the temporary memory when received from the LTE-RAN 122.

Subsequently, the UE 110 may be positioned in proximity or otherwise capable of utilizing the companion relationship with the UE 112 such that the short-range communication protocol is used. As noted above, when this operation occurs, the baseband of the UE 110 may deactivate or switch off completely to conserve power and any data exchange is performed over the short-range communication protocol. As will be described in detail below, this operation may be described as a non-user triggered deactivation. This deactivation of the baseband will cause the data that is stored in the temporary memory of the baseband (e.g., the information associated with the forbidden LA/RA/TA) to be lost.

At a later time, the UE 110 may re-activate the baseband. For example, the UE 110 may be positioned such that the companion relationship is not capable of being used and the short-range communication protocol is unavailable with the UE 112. Accordingly, the baseband may be re-activated. Again, as will be described in detail below, the baseband being re-activated in this manner may be a non-user triggered activation. As noted above, a power cycle of the baseband may result in data in a temporary memory to be deleted such as any rejection causes that were stored. Therefore, if the UE 110 has any forbidden LA/RA/TA before the power cycle, this information that was stored is erased. If the UE 110 had the SIM invalidated by the LTE-RAN 122 before the power cycle, the marking of the SIM may be deleted.

In either case, the rejection cause may be deleted/unavailable and subsequent registration procedures may be performed without any prior historical information of the results of previous registration procedures. When there has been no significant change to the circumstances of the UE 110, the registration procedure attempts may be redundant and unnecessary because the saved non-fatal or fatal rejection cause may occur as an earlier non-fatal or fatal rejection cause. When the UE 110 moves into and out of proximity of the companion UE 112, the UE 110 may repeatedly perform unsuccessful registration attempts. The repeated unsuccessful registration attempts entail performing a plurality of operations that dissipate the power supply of the UE 110, and there also may be a performance degradation from increasing the time taken to establish a stable network service.

To compensate for scenarios such as the one described above, the exemplary embodiments provide a mechanism to persist a stored reject cause to be used in considering how to proceed with performing connection operations including a registration procedure. The mechanism according to the exemplary embodiments may initially be configured to perform an additional storage operation. Specifically, the rejection cause that is stored in the temporary memory of the baseband may also be stored in a persistent or non-volatile memory of the UE 110. The UE 110 may also store other information (e.g., SIM) with respect to a user subscription (e.g., IMSI, ICCID, etc.). The UE 110 may further store time related information (e.g., a timestamp) used to help identify details/validity of persistent information. When stored in the persistent memory, even if the UE 110 is rebooted, the baseband is power cycled, and/or the SIM is physically removed/replaced, the rejection cause may still be available in the persistent memory. Therefore, when a non-user triggered deactivation/re-activation (e.g., a non-user triggered power cycle) is performed on the baseband such that the rejection cause in the temporary memory is deleted, the mechanism according to the exemplary embodiments may be used to use the persistent rejection cause. As will be described in detail below, the UE 110 may match the details of the persistent rejection cause and other details to details of current circumstances of the UE 110. Specifically, when the persistent rejection cause is a non-fatal cause, the match may be to a currently camped LA/RA/TA of the UE 110.

When the persistent rejection cause is a fatal cause, the match may be to the IMSI or other SIM details.

It is noted that the mechanism according to the exemplary embodiments uses non-user triggered deactivation/re-activation operations. That is, the power cycle of the baseband or otherwise deletion of the stored rejection cause is from operations that are automatically performed by applications on the UE 110 rather than actions or operations performed by a user. Thus, the exemplary embodiments may be used when the reason for the power cycle of the baseband is based on a non-user deactivated/re-activated operation. Examples of user-activated operations that cause the power cycle on the baseband may include physically removing the SIM (and subsequently replacing with the same SIM or new SIM), manually rebooting the baseband or the UE 110, etc. When the power cycle of the baseband is determined to be from a user-activated operation, the mechanism according to the exemplary embodiments may assume that any previous rejection cause is to be ignored for performing subsequent registration procedures. That is, a persistent rejection cause may be deleted or omitted from consideration because the user may have intended for the rejection cause to be deleted and a new connection attempt to be performed.

It is also noted that the use of the power cycle of the baseband or the UE 110 being the reason for the rejection cause to be deleted from the temporary memory is only exemplary. Those skilled in the art will understand that there are a variety of reasons for the rejection cause or the temporary memory in general to delete stored data. For example, the above noted user-activated operations may also cause the stored data in the temporary memory to be deleted. Accordingly, the exemplary embodiments may be configured to persist the rejection cause whenever a rejection cause is received. The exemplary embodiments are also configured to selectively determine when the persistent rejection cause is to be used based on the reason that the stored data corresponding to the rejection cause has been deleted (e.g., non-user activated operation or user activated operation).

Figure 2:
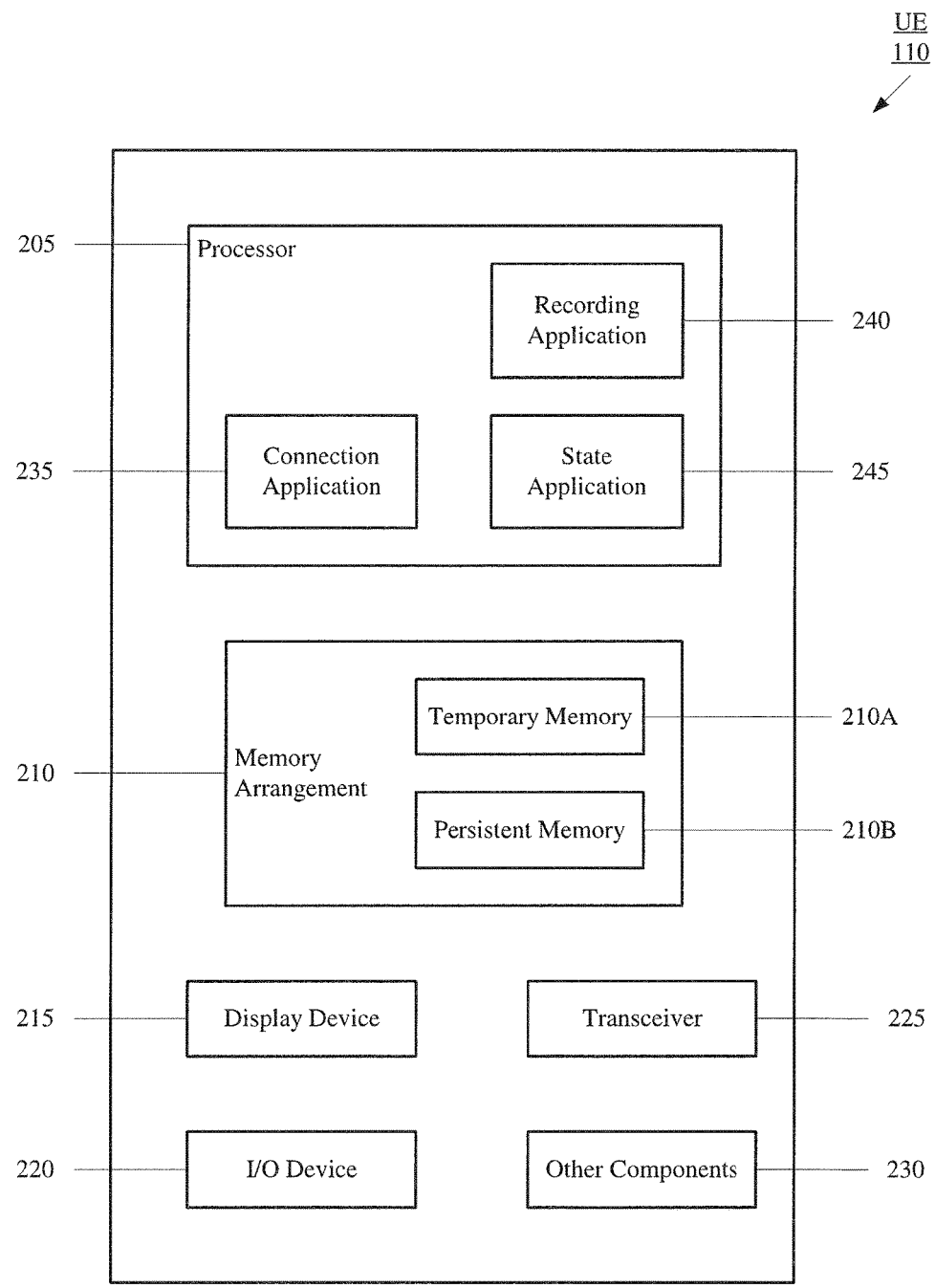
FIG. 2 shows a user equipment according to the various exemplary embodiments described herein.

FIG. 2 shows the UE 110 of the network arrangement 100 of FIG. 1 according to the exemplary embodiments. Specifically, the UE 110 is configured to execute a plurality of applications that perform functionalities to persist rejection cause information from at least one prior registration procedure attempt and utilize this persistent rejection cause when appropriate. The UE 110 may represent any electronic device that is configured to perform wireless functionalities and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, etc.

The processor 205 may be configured to execute a plurality of applications of the UE 110. For example, the applications may include a connection application 235, a recording application 240, and a state application 245. As will be described in further detail below, the connection application 235 may be configured to perform connection operations to connect to the LTE-RAN 122. The recording application 240 may be configured to perform storage operations in a temporary and persistent manner. The state application 245 may be configured to determine a reason for the baseband to become activated.

It should be noted that the above noted applications each being an application (e.g., a program) executed by the processor 205 is only exemplary. The functionality associated with the applications may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. In addition, in some UEs, the functionality described for the processor 205 is split among two processors, a baseband processor and an applications processor. The exemplary embodiments may be implemented in any of these or other configurations of a UE. For example, the connection application 235 may be implemented on a baseband processor whereas the recording application 240 and the state application 245 may be implemented on an applications processor.

The memory 210 may be a hardware component configured to store data related to operations performed by the UE 110. The memory 210 may include a temporary memory 210A and a persistent memory 210B. As those skilled in the art will understand, the temporary memory 210A may be any volatile memory in which data stored therein does not persist when a power cycle is experienced. In contrast, the persistent memory 210B may be any non-volatile memory in which data stored therein persists when a power cycle is experienced. For example, the temporary memory 210A may be a RAM while the persistent memory 210B may be a flash memory.

The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to exchange data with a base station associated with the LTE-RAN 122 (e.g., an evolved Node B (eNB)). Accordingly, the transceiver 225 may operate on a variety of different frequencies or channels (e.g., set of consecutive frequencies). Therefore, the transceiver 225 may include one or more components to enable the data exchange with the various networks and UEs. For example, a first component of the transceiver 225 (that is part of the baseband) may enable a BlueTooth connection to be established with the UE 112 and a second component of the transceiver 225 may enable a LTE connection to be established with the LTE-RAN 122. One or more antennas (not shown) may be coupled to these one or more components of the transceiver 225 to enable the transceiver 225 to operate on the various frequency bands.

As described above, the connection application 235 may be configured to perform connection operations to connect to the LTE-RAN 122. The connection operations may be any operation used to establish a connection between the UE 110 and the LTE-RAN 122 such that data may be exchanged with an associated eNB of the LTE-RAN 122 and utilize services (e.g., with the IMS 150). For example, the registration procedure may be included in the connection operations. The connection operations may include providing information from the SIM of the UE 110 and/or other identifying information (e.g., capabilities of the UE 110, an operating system of the UE 110, etc.).

The connection application 235 may also have an allocated section of the temporary memory 210A to be used in performing the connection operations. The allocation in the temporary memory 210A may be performed using any mechanism as those skilled in the art will understand. It is noted that whenever the connection application 235 is activated and being used, the allocation in the temporary memory 210A may be performed and the corresponding section may be known. With the connection application 235 having an allocated section in the temporary memory 210A, the connection application 235 may access the allocated section and use data stored therein.

Specifically, the allocated section may be used to store historical information such as results from prior registration procedure attempts. When there is no data yet stored in the allocated section, the connection application 235 may assume that there is no historical information and proceed in performing the connection operations with this assumption.

The recording application 240 may be configured to perform storage operations in a temporary and persistent manner. Specifically, the recording application 240 may store results of registration procedure attempts. As noted above, the recording application 240 may be configured with a first storage operation in which data corresponding to the results of the registration procedure attempts is stored in the temporary memory 210A, particularly in the allocated section of the connection application 235. Thus, while the baseband of the UE 110 is activated, the data corresponding to the results of the registration procedure attempts may be available in the allocated section of the temporary memory 210A.

The recording application 240 may be configured with a second storage operation according to the exemplary embodiments. In addition to storing the data corresponding to the results of the registration procedure attempts in the allocated section of the temporary memory 210A associated with the connection application 235, the recording application 240 may further store the data corresponding to the results of the registration attempts in the persistent memory 210B. The recording application 240 may store the data in the persistent memory 210B in a manner corresponding to whether the result includes a non-fatal cause (e.g., a corresponding code) or a fatal cause (e.g., a corresponding code). For example, when the result includes a non-fatal cause, the recording application 240 may store data corresponding to a list of forbidden LA/RA/TA received from the LTE-RAN 122 in the temporary memory 210A as well as store this data in the persistent memory 210B along with other corresponding information at the time this result occurred (e.g., a timestamp, an associated timer for keeping the data in the temporary memory 210A when no intervening operation is performed such as a power cycle, the IMSI, an integrated circuit card identifier (ICCID), other SIM details perceived as necessary, etc.). In another example, when the result includes a fatal cause, the recording application 240 may store data corresponding to a marking that the SIM is invalidated by the LTE-RAN 122 as well as store this data in the persistent memory 210B along with other SIM details (e.g., IMSI, ICCID, etc.).

Using the above operations, the UE 110 may perform an initial part of the mechanism according to the exemplary embodiments. That is, whenever attempts of the registration procedure are made by the UE 110 when connecting to the LTE-RAN 122, the UE 110 may redundantly store results of these attempts in both the temporary memory 210A and the persistent memory 210B where the storing in the persistent memory 210B may further include any associated information.

The state application 245 may be configured to determine a reason for the baseband to become activated. As noted above, the state application 245 may be performed by a higher level component such as the applications processor. Accordingly, the state application 245 may monitor the baseband and be aware of the type of deactivation/re-activation (e.g., power cycle) performed on the baseband. Specifically, the state application 245 may determine whether a power cycle was activated with a user activated operation or a non-user activated operation.

As noted above, the state application 245 may identify when a user activated operation is performed as the reason for the baseband to be power cycled such that data stored in an allocated section of the temporary memory 210A is deleted. In a first example, the state application 245 may detect when a power input is received from the user. For example, the I/O device 220 may include a power input that the user may use to activate the UE 110 from a deactivated state or deactivate the UE 110 from an activated state. In a particular example, the user may reboot the UE 110 which results in a power cycle. In a second example, the state application 245 may detect that if the SIM card has been physically removed and/or replaced (either with the same SIM card or a new SIM card). As the physical removal of the SIM card entails the user performing this action, the state application 245 may identify the user activated operation as the cause for the power cycle of the baseband.

The state application 245 may also identify when a non-user activated operation is performed as the reason for the baseband to be power cycled. The non-user activated operation may be the reason any time a baseband power cycle is performed without any user activated operation. That is, the introduction of any user activated operation in the power cycle may automatically qualify as the reason being user activated. For example, if the deactivation aspect of the power cycle were performed from a non-user activated operation (e.g., availability of using the companion relationship over the short-range communication protocol) but the re-activation aspect of the power cycle were performed from a user activated operation (e.g., manually rebooting the UE 110), the reason for the power cycle may be considered a user activated operation. In contrast, if the deactivation aspect of the power cycle were performed from a non-user activated operation (e.g., availability of using the companion relationship over the short-range communication protocol) and the re-activation aspect of the power cycle were also performed from a non-user activated operation (e.g., the UE 110 moving away from the UE 112 outside an operating range of the short-range communication protocol such that the baseband is used to establish a connection to the LTE-RAN 122), the reason for the power cycle may be considered a non-user activated operation.

Based on the reason for the baseband to be power cycled or more generally for the data in the allocated section of the temporary memory 210A associated with the connection application 235 to be deleted, the state application 245 may perform subsequent operations and/or instruct the connection application 235 and/or the recording application 240 to perform subsequent operations. Furthermore, the mechanism according to the exemplary embodiments may also consider how to perform the subsequent operations when the reason is a non-user activated operation based on whether a persistent rejection cause is a non-fatal cause or a fatal cause.

As noted above, when the reason for the baseband to be power cycled is based on a user activated operation, there may be an assumption that the user intentionally power cycled the baseband. For example, the user may have reason to attempt another registration procedure if a rejection cause was previously provided by the LTE-RAN 122 but the registration procedure should have been successful (e.g., a SIM refresh). In another example, the user may have replaced an invalid SIM card with a new valid SIM card (e.g., a SIM removal). The state application 245 may be configured with this assumption. Accordingly, any persistent rejection cause that may be stored in the persistent memory 210B may be ignored. The persistent rejection cause that may be stored in the persistent memory 210B may also be deleted if the IMSI or other SIM details associated with the persistent rejection cause are identified as different from a current IMSI or current SIM details. Therefore, the state application 245 may instruct the connection application 235 to proceed with performing the connection operations including the registration procedure with the LTE-RAN 122. When power cycled, the connection application 235 may have been allocated a section of the temporary memory 210A. However, since this allocated section is empty, the connection application 235 may proceed as if there is no historical information.

The state application 245 may also instruct the recording application 240 to perform a subsequent operation. In addition to the storage functionalities described above for the recording application 240, the recording application 240 may also perform a deletion functionality. Specifically, when the reason for the baseband being power cycled is a user activated operation, the state application 245 may instruct the recording application 240 to perform the deletion functionality to delete any persistent rejection cause stored in the persistent memory 210B. Again, with the above assumption that the user power cycled the baseband intentionally, any previously experienced rejection from the registration procedure may be ignored and thus any result from performing the registration procedure may also be ignored. It is noted that the state application 245 may instruct the recording application 240 to perform this deletion functionality prior to instructing the connection application 235 to proceed with the connection operations.

When the reason for the baseband to be power cycled is based on a non-user activated operation, the assumption associated with reason being the user activated operation is no longer present. Accordingly, any persistent rejection cause that may be stored in the persistent memory 210B may be relevant to the state of the UE 110 upon the baseband being re-activated. Again, when power cycled, the connection application 235 may have been allocated a section of the temporary memory 210A. However, prior to instructing the connection application 235 to perform subsequent connection operations, the state application 245 may instruct the recording application 240 to push data from the persistent memory 210B into the temporary memory 210A, specifically to the allocated section associated with the connection application 235. Accordingly, an initial operation of the state application 245 for this functionality may be to determine whether there is any persistent rejection cause stored in the persistent memory 210B. If no persistent rejection cause is found, the state application 245 may proceed in a substantially similar manner as if the reason for the baseband being power cycled was a user activated operation. However, if a persistent rejection cause is found, the state application 245 may proceed in a different manner and this manner in which this functionality is performed may be based on whether the persistent rejection cause stored in the persistent memory 210B is a non-fatal cause or a fatal cause.

When the state application 245 identifies that the persistent rejection cause stored in the persistent memory 210B is a non-fatal cause, the state application 245 may first determine if the persistent rejection cause is still valid. As noted above, the rejection cause may be stored in the persistent memory 210B with associated information such as time related information and identity related information.

In a first example of validating the persistent non-fatal cause, the state application 245 may determine if a stored timestamp associated with the non-fatal cause indicates that the list of forbidden LA/RA/TA is no longer valid. The timestamp may be compared to the associated timer when the list was created where the timer indicates for how long the list is to remain valid. Accordingly, if the persistent non-fatal cause had been persisted for a duration beyond the timer based on the timestamp and a current time, the state application 245 may determine that the non-fatal cause is no longer valid and not to be used. Therefore, the state application 245 may proceed in a substantially similar manner as if the reason for the baseband being power cycled was a user activated operation. However, if the persistent non-fatal cause is still valid, the state application 245 may perform further operations including instructing the recording application 240 to push the persistent non-fatal cause from the persistent memory 210B to the temporary memory 210A and then instructing the connection application 235 to perform the connection operations. Once the recording application 240 has pushed the data into the allocated section of the temporary memory 210A corresponding to the connection application 235, the state application 235 may also instruct the recording application 240 to delete the data corresponding to the persistent non-fatal cause from the persistent memory 210B.

In a second example of validating the persistent non-fatal cause, the state application 245 may determine whether details of a current SIM match details of the SIM associated with the persistent non-fatal cause. For example, the SIM may have associated details that include the IMSI, the ICCID, etc. Since the persistent non-fatal cause was based on the SIM having these associated details, subsequent use of the persistent non-fatal cause should also only apply when the current SIM has the same details. Accordingly, if the persistent non-fatal cause has different SIM details from the current details of the SIM of the UE 110, the state application 245 may determine that the non-fatal cause is no longer applicable and not to be used. Therefore, the state application 245 may proceed in a substantially similar manner as if the reason for the baseband being power cycled was a user activated operation. However, if the persistent non-fatal cause has matched SIM details to the current details of the SIM of the UE 110, the state application 245 may perform further operations including instructing the recording application 240 to push the persistent non-fatal cause from the persistent memory 210B to the temporary memory 210A and then instructing the connection application 235 to perform the connection operations. Once the recording application 240 has pushed the data into the allocated section of the temporary memory 210A corresponding to the connection application 235, the state application 235 may also instruct the recording application 240 to delete the data corresponding to the persistent non-fatal cause from the persistent memory 210B.

It is noted that the state application 245 using the above manners of validating the non-fatal cause is only exemplary. The exemplary embodiments may be configured such that the state application 245 may utilize other forms of validating the persistent non-fatal cause stored in the persistent memory 210B. Furthermore, the state application 245 may utilize any combination or all of the manners of validating the non-fatal cause. Specifically, if any of the manners of validating were to indicate that the persistent non-fatal cause were invalid, the state application 245 may assume that the persistent non-fatal cause is no longer valid. For example, if the persistent non-fatal cause were still valid based on the timer but invalid based on the SIM details, the state application 245 may determine that the persistent non-fatal cause is invalid.

When the state application 245 identifies that the persistent rejection cause stored in the persistent memory 210B is a fatal cause, the state application 245 may first determine if the persistent rejection cause is still valid. Again, the rejection cause may be stored in the persistent memory 210B with associated information such as time related information and identity related information. The state application 245 may initially wait for the SIM to become ready. Once ready, the state application 245 may utilize a substantially similar operation as the second example described above for validating the persistent non-fatal cause. Specifically, the state application 245 may determine whether the same SIM and/or the same conditions are present in the UE 110 after the baseband has been power cycled. It is noted that the use of when the SIM is ready triggering the functionality of the state application 245 for validating/invalidating the SIM is only exemplary. For example, according to other exemplary embodiments, the state application 245 may perform its functionality at other times (e.g., when attempting to camp on a network).

When the persistent rejection cause is a fatal cause, the state application 245 may perform further operations different than when the persistent rejection cause is a non-fatal cause. When the SIM details and conditions of the UE 110 at the time the fatal cause was received are different from the current SIM details and/or the current conditions of the UE 110, the state application 245 may proceed in a substantially similar manner as if the reason for the baseband being power cycled was a user activated operation. The state application 245 may also instruct the recording application 240 to delete the data corresponding to the invalidated SIM in the persistent memory 210B. However, when the SIM details and conditions of the UE 110 at the time the fatal cause was received is the same as the current SIM details and current conditions of the UE 110, the state application 245 may determine that the SIM is to be invalidated again. Accordingly, the state application 245 may instruct the recording application 240 to push the marked indication that the SIM is invalid from the persistent memory 210B to the temporary memory 210A. Thereafter, the state application 245 may instruct the connection application 235 to proceed with the connection operations. However, when the connection application 235 checks its allocated section in the temporary memory 210A and detects that the SIM has been marked as invalidated, the connection application 235 may terminate the connection operations before the registration procedure is even initiated.

In view of the above mechanism according to the exemplary embodiments, the UE 110 may perform connection operations in a more efficient manner that increases power conservation when scenarios arise where results of previous attempts in performing a registration procedure are persisted despite operations having been performed that delete these results from the temporary memory 210A. By utilizing the mechanism according to the exemplary embodiments, the UE 110 may avoid unnecessary registration attempts on forbidden LA/RA/TA upon disconnecting with the companion UE 112, avoid unnecessary registration attempts on networks that have already invalidated the SIM, and generally save power and improve performance.

Figure 3:
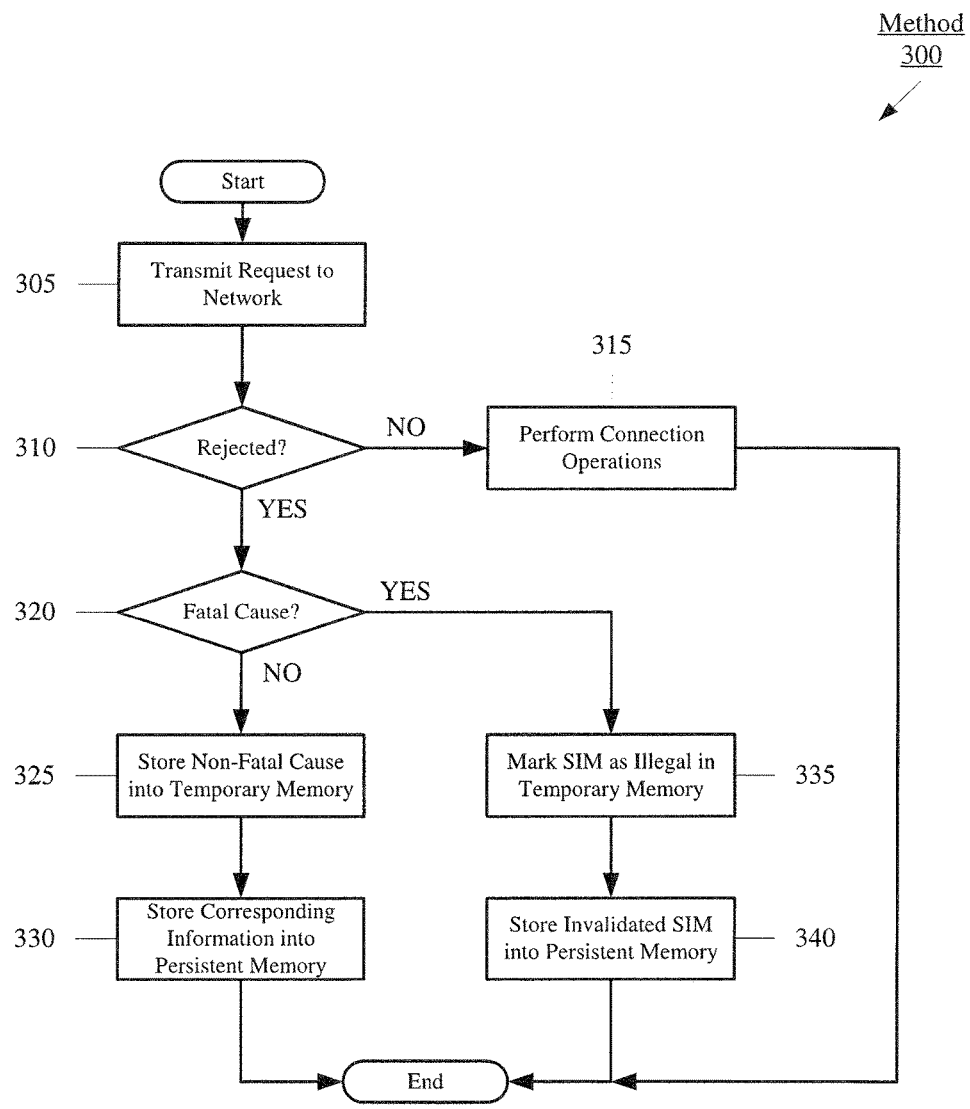
FIG. 3 shows a method for persisting rejection cause data while registering with a network according to the various exemplary embodiments described herein.

FIG. 3 shows a method 300 for persisting rejection cause data while registering with a network according to the various exemplary embodiments described herein. The method 300 relates to a first aspect of the mechanism according to the exemplary embodiments where rejection causes received from the LTE-RAN 122 are redundantly stored in the memory arrangement 210. The method 300 may be performed by the connection application 235 and/or the recording application 240. The method 300 will be described with regard to the network arrangement 100 of FIG. 1 and the UE 110 of FIG. 2.

In 305, the UE 110 transmits a request to register with the LTE-RAN 122. That is, the connection application 235 performs connection operations including a registration procedure to connect to the LTE-RAN 122 and/or utilize services and features such as from the IMS 150. The UE 110 may transmit various information including identification information (e.g., details of the SIM).

In 310, the UE 110 receives a response from the LTE-RAN 122 as to whether the request has been accepted and the registration has been successful. If the LTE-RAN 122 has not rejected the request, the UE 110 continues to 315 where the UE 110 performs the connection operations to establish the connection with the LTE-RAN 122. For example, any authentication procedure and/or association procedure may be used.

If the LTE-RAN 122 has rejected the request, the UE 110 continues to 320 where the UE 110 determines if the response from the LTE-RAN 122 included a non-fatal cause or a fatal cause as a rejection cause. If the LTE-RAN 122 rejected the request and provided a non-fatal cause, the UE 110 continues to 325. In 325, the UE 110 stores the non-fatal cause as a list of forbidden LA/RA/TA in an allocated section in the temporary memory 210A associated with the connection application 235. In 330, the UE 110 stores the corresponding information for the non-fatal cause in the persistent memory 210B. If the LTE-RAN 122 rejected the request and provided a fatal cause, the UE 110 continues from 320 to 335. In 335, the UE 110 marks the SIM as illegal in the temporary memory 210A. In 340, the UE 110 stores the marking of the invalidated SIM and other relevant details into the persistent memory 210B.

It is noted that the method 300 may be an iterative process so long as the UE 110 is being used or activated. More specifically, while the baseband remains activated, the method 300 may store or overwrite results of any connection operation or registration procedure performed by the UE 110.

Figure 4:
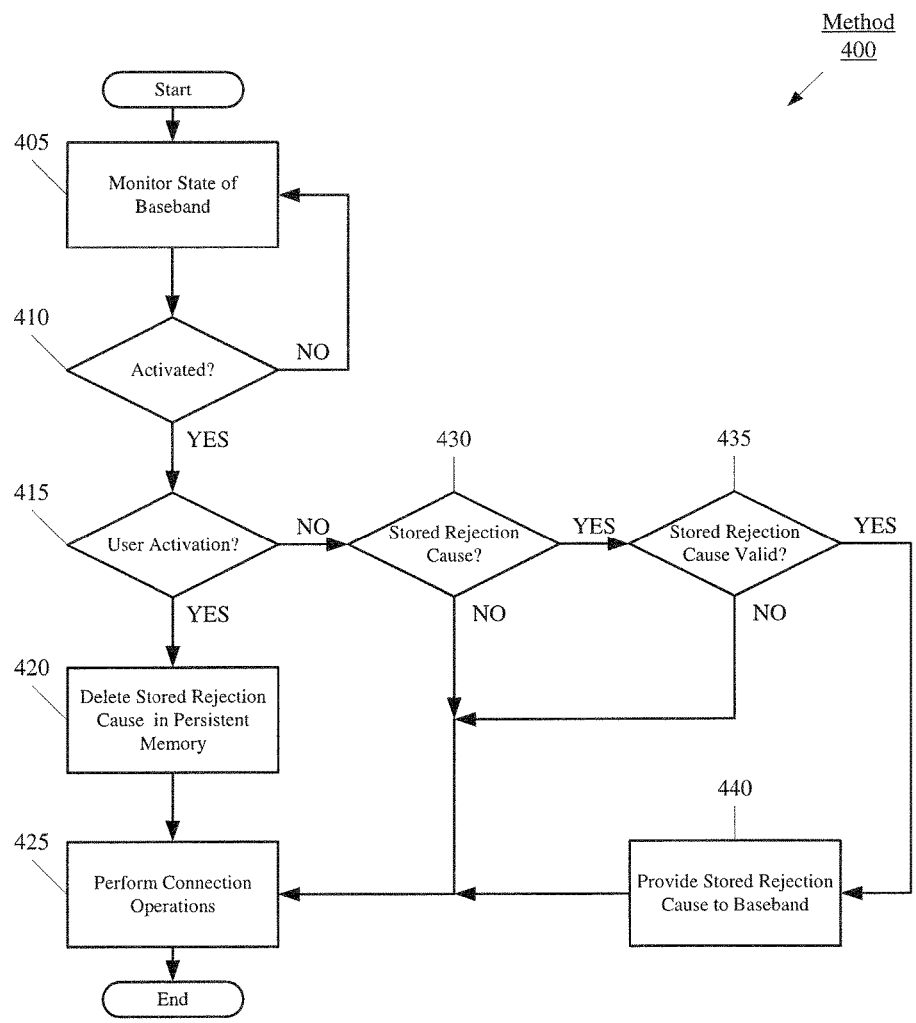
FIG. 4 shows a method for utilizing persistent rejection cause data prior to registering with a network according to the various exemplary embodiments described herein.

FIG. 4 shows a method 400 for utilizing persistent rejection cause data prior to registering with a network according to the various exemplary embodiments described herein. The method 400 relates to a second aspect of the mechanism according to the exemplary embodiments where rejection causes that are persisted may be considered to be used for further attempts in performing connection operations. The method 400 may be performed by the connection application 235, the recording application 240, and/or the state application 245. The method 400 will be described with regard to the network arrangement 100 of FIG. 1 and the UE 110 of FIG. 2.

In 405, the state of the baseband is monitored. It may be assumed that the baseband is currently deactivated for any of a variety of reasons. Thus, in 410, it is determined whether the baseband has been activated. If the baseband remains deactivated, the method 400 returns to 405 to continue monitoring the baseband and determine if the baseband has been activated.

If the baseband has been activated, in 415, it is determined how the baseband has been activated. Specifically, it is determined if the baseband has been activated with a user activated operation or a non-user activated operation. As described above, the baseband may be deactivated by different user operations (e.g., deactivation from rebooting the baseband or UE 110, physically removing the SIM card, etc.) and non-user operations (e.g., using the companion relationship via the short-range communication protocol). The baseband may subsequently be activated by different user operations (e.g., re-activation from rebooting the baseband or UE 110, replacing the SIM card and re-activating the UE 110, etc.) and non-user operations (e.g., disconnecting from the companion UE 112).

If the baseband has been activated with a user activated operation, in 420, the method 400 may proceed with an assumption that the baseband was intentionally power cycled and the data stored in an allocated section of the temporary memory 210A is to be purposefully deleted. Accordingly, any rejection cause that may have been received prior to the baseband being deactivated may be ignored. Accordingly, if any rejection cause has been persisted in the persistent memory 210B, in 420, the stored fatal rejection cause(s) is/are deleted. In 425, the UE 110 performs connection operations. In this case, the UE 110 performs the connection operations as if no historical information is available.

Returning to 415, if the baseband has been activated with a non-user activated operation, in 430, it is determined whether there are any persistent rejection causes stored in the persistent memory 210B. If the method 300 had been performed prior to the method 400, there may be a persistent rejection cause that may have been stored in the persistent memory 210B. In contrast, if previous registration procedures were successful or the baseband had not been activated previously, there may not be any persistent rejection cause. If it is determined that there is no persistent rejection cause in the persistent memory 210B, in 425, the UE 110 performs connection operations. In this case, the UE 110 performs the connection operations as if no historical information is available.

Returning to 430, if it is determined that there is a persistent rejection cause in the persistent memory 210B, in 435, it is determined whether the persistent rejection cause is valid. As described above, it may be determined whether the persistent rejection cause is valid based on associated information stored with the persistent rejection cause at the time the rejection cause was received from the LTE-RAN 122. As described above, if the persistent rejection cause is a non-fatal cause, the validation may be performed based on time information, identity information, a combination thereof, etc. If the persistent rejection cause is a fatal cause, the validation may be performed based on identity information and whether the current conditions of the UE 110 match the conditions at the time the fatal cause was received. If the persistent rejection cause is invalid, in 425, the UE 110 performs connection operations. In this case, the UE 110 performs the connection operations as if no historical information is available.

If the persistent rejection cause is valid, in 440, the persistent rejection cause is pushed from the persistent memory 210A to the allocated section in the temporary memory 210B associated with the connection application 235. As described above, when the persistent rejection cause is a non-fatal cause, the forbidden list of LA/RA/TA may be pushed into the temporary memory 210A. When the persistent rejection cause is a fatal cause, the marking that the SIM is illegal may be moved to the temporary memory 210A. Subsequently, in 425, the UE 110 performs connection operations. In this case, the UE 110 performs the connection operations by accessing the stored data in the allocated section of the temporary memory 210A and proceeds by considering the rejection cause. For example, with a non-fatal cause, the UE 110 may perform the registration procedure if the current LA/RA/TA is different from the LA/RA/TA of the non-fatal cause. In another example, the UE 110 may prevent any registration procedure from being performed if the SIM is marked as illegal from a rejection cause being a fatal cause.

The exemplary embodiments provide a device, system, and method of persisting a rejection cause as a result of performing connection operations with a network. The persisting of the rejection cause may be achieved by redundantly storing the rejection cause in both a temporary memory and a persistent memory. Thus, if a baseband is power cycled or the data in the temporary memory becomes deleted, the persistent rejection cause in the persistent memory may be used when the baseband is re-activated. When scenarios arise where the persistent rejection cause is still applicable, the UE may conserve power and improve performance by preventing the performance of connection operations that result in a rejection.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a device that is configured to establish a connection to a network, the device comprising a memory arrangement including a temporary memory and a persistent memory, the device using the data stored in the temporary memory when performing operations associated with registering with the network:
   transmitting a first request to the network, wherein the first request corresponds to a first attempt to register with the network;
   receiving a response to the first request from the network, the response including a rejection cause;
   storing the rejection cause in the temporary memory and in the persistent memory;
   when a power cycle is detected, determining whether there is persistent data in the persistent memory corresponding to a result from the first attempt to register with the network, wherein the first attempt occurred prior to the power cycle and the persistent data includes the rejection cause received from the network in response to the first request;

when there is the persistent data in the persistent memory, determining whether the persistent data is valid to use in a second attempt to register with the network after the power cycle;

when the persistent data is valid, generating cause data based on the persistent data; and storing the cause data in the temporary memory prior to performing the second attempt.

2. The method of claim 1, wherein the rejection cause is one of a non-fatal cause or a fatal cause.

3. The method of claim 2, wherein the non-fatal cause is based on one of a forbidden location area, a forbidden routing area, or a forbidden tracking area.

4. The method of claim 2, wherein the fatal cause is based on subscriber identity information.

5. The method of claim 1, further comprising:
prior to the determining whether there is the persistent data in the persistent memory, determining whether the power cycle is performed based on one of a user activated operation and a non-user activated operation.

6. The method of claim 5, further comprising:
when the power cycle is performed based on the user activated operation, performing the second attempt prior to the determining whether there is the persistent data in the persistent memory.

7. The method of claim 5, wherein the user activated operation is one of rebooting the device, rebooting a baseband of the device associated with the network, or physically replacing a subscriber identity module (SIM) card of the device.

8. The method of claim 5, wherein the device is further configured to establish a connection to a further device via a short-range communication pathway.

9. The method of claim 8, wherein the non-user activated operation for the power cycle is when the device establishes the short-range communication pathway and deactivates a baseband of the device associated with the network then subsequently disconnects the short-range communication pathway and re-activates the baseband of the device.

10. The method of claim 1, further comprising:
determining associated information of the device when the rejection cause is received; and
storing the associated information in the persistent memory.

11. The method of claim 10, wherein the associated information is based on a time the rejection cause is received.

12. The method of claim 11, wherein the associated information is one of a timestamp of when the rejection cause is received, a timer associated with how long the rejection cause is valid, an international mobile subscriber identity (IMSI), an integrated circuit card identifier (ICCID), or a combination thereof.

13. The method of claim 11, wherein the determining whether the persistent data is valid is based on the associated information and current information of the device at a time when the power cycle is detected.

14. A device, comprising:
a transceiver;
a memory arrangement including a temporary memory and a persistent memory;
a baseband processor configured in conjunction with the transceiver to establish a connection to a network, wherein the baseband processor uses data stored in the temporary memory when performing operations associated with registering with the network; and
an applications processor configured to detect a power cycle of the baseband processor, when the power cycle is detected, the applications processor determining whether there is persistent data in the persistent memory corresponding to a result from a first attempt to register with the network prior to the power cycle, the persistent data including a rejection cause received from the network for the first attempt,
wherein, prior to determining whether there is persistent data in the persistent memory, the applications processor determines whether the power cycle was performed based on one of a user activated operation and a non-user activated operation,
wherein, when there is the persistent data in the persistent memory, the applications processor determines whether the persistent data is valid to use in a second attempt to register with the network after the power cycle,
wherein, when the persistent data is valid, the applications processor generates cause data based on the persistent data, and
wherein, the applications processor stores the cause data in the temporary memory prior to the baseband processor performing the second attempt.

15. The device of claim 14, wherein the rejection cause is one of a non-fatal cause or a fatal cause, the non-fatal cause being based on one of a forbidden location area, a forbidden routing area, or a forbidden tracking area, the fatal cause is based on subscriber identity information.

16. The device of claim 14, wherein when the power cycle is performed based on the user activated operation, the baseband processor performs the second attempt prior to the determining whether there is the persistent data in the persistent memory.

17. The device of claim 16, wherein the transceiver is further configured to establish a further connection to a further device via a short-range communication pathway.

18. The device of claim 17, wherein the power cycle is from establishing the short-range communication pathway and deactivating the baseband processor then subsequently disconnecting the short-range communication pathway and re-activating the baseband processor.

19. A method, comprising:
at a device that is configured to establish a connection to a network, the device comprising a memory arrangement including a temporary memory and a persistent memory, the temporary memory deleting data stored therein after a power cycle, the persistent memory persisting data stored therein after the power cycle, the device using the data stored in the temporary memory when performing operations associated with registering with the network:
transmitting a request to the network wherein the request corresponds to a first attempt to register with the network;
receiving a response to the request from the network;
when the response includes a rejection cause indicating the request is rejected, storing the rejection cause in both the temporary memory and the persistent memory, wherein, after a power cycle, the rejection cause is capable of being used in a further request to the network to register with the network.

* * * * *